United States Patent [19]

McKibben

[11] Patent Number: 4,876,015

[45] Date of Patent: Oct. 24, 1989

[54] METHOD AND APPARATUS FOR RECLAIMING USED HYDRAULIC FLUID

[75] Inventor: Kenneth D. McKibben, Defiance, Ohio

[73] Assignee: CMI International, Inc., Southfield, Mich.

[21] Appl. No.: 233,734

[22] Filed: Aug. 19, 1988

[51] Int. Cl.$^4$ .............................................. B03C 1/30
[52] U.S. Cl. ................................... 210/695; 210/774; 210/803; 210/180; 210/187; 210/223; 210/532.1; 210/539; 210/168
[58] Field of Search ............... 210/695, 801, 800, 803, 210/804, 805, 774, 187, 180, 188, 222, 223, 532.1, 539, 519, 168, 194; 184/6.25, 6.24

[56] References Cited

U.S. PATENT DOCUMENTS

| | | | |
|---|---|---|---|
| 437,659 | 9/1890 | Noppel | 210/180 |
| 1,404,931 | 1/1922 | Corwin | 210/223 |
| 2,152,863 | 4/1939 | Bills | 210/187 |
| 2,868,313 | 1/1959 | Leuszler et al. | 210/187 |
| 3,139,403 | 6/1964 | Cramer et al. | 210/222 |
| 4,238,332 | 12/1980 | Samuel et al. | 210/774 |

FOREIGN PATENT DOCUMENTS 337981 11/1930 United Kingdom ................ 210/187

Primary Examiner—W. Gary Jones
Assistant Examiner—Matthew O. Savage
Attorney, Agent, or Firm—Harness, Dickey & Pierce

[57] ABSTRACT

Small quantities of dirty oil used in industrial facilities, such as hydraulic fluid, lubricating oil and the like, are reclaimed by placing a batch of such fluid in a relatively small, vertically axised tank having an elongated, transversely arranged, low-temperature heater located a distance above the tank bottom. The heater causes the fluid to generally circulate upwardly and downwardly in closed loops within the tank portion above the heater so that foreign particles and water gravity-settle into the tank portion below the heater. Transversely arranged rows of permanent magnets located in the tank above the heater attract and immobilize magnetizable ferrous particles carried by the fluid. After a period of fluid circulation, the cleaned fluid located generally above the heater is pumped out of the tank for re-use. The fluid and the settled foreign materials, including the water, sludge, dirt and the like accumulated in the bottom of the tank, beneath the heater, are periodically drained from the bottom of the tank.

16 Claims, 1 Drawing Sheet

METHOD AND APPARATUS FOR RECLAIMING USED HYDRAULIC FLUID

BACKGROUND OF THE INVENTION

This invention relates to a method and apparatus for reclaiming small quantities of oil that have been used as hydraulic fluid, lubricating fluid and the like within an industrial plant or similar smallquantity user of oil.

In many industrial plants, garages and like industrial facilities, small quantities of oil are used as hydraulic fluid for controlling and operating machinery, for lubrication, for cooling fluid or for like purposes. By way of example, such a facility may use one-half to one 55 gallon drum of oil per week or per month or similar small quantities.

In use, hydraulic fluid, lubricating fluid, cooling fluid or like purpose fluid tend to accumulate dirt, sludge, water, trapped air, metal particles, such as shavings or chips, and other foreign materials. Thus, in some cases after a single use and in some cases after a limited number of uses, the oil becomes too "dirty" for re-use and must be discarded.

In the past, discarding small quantities of dirty oil has not been a problem as the material was simply dumped at any convenient outdoor location or down a sewer. However, in recent times, due to environmental protection policies, dirty oil has to be handled much more carefully and disposed of in a controlled manner to avoid contamination of land or water. In many cases, this involves arranging for the pick-up and transportation of the used oil from the industrial facility in which it had been used, arranging for disposing of the used oil or, if quantities and marketing conditions permit, for reprocessing such dirty oil in substantial quantities in order to economically reclaim the oil.

For a typical industrial facility or similar user of relatively small quantities of oil, discarding used oil is a nuisance and frequently is relatively expensive. Thus, there has been a need for an inplant system which economically processes very small quantities of "dirty" oil so that the oil may be re-used in order to substantially eliminate the problem of disposal of dirty oil. As an example of a single industrial facility in which such equipment can be useful, a metal casting foundry utilizes hydraulic fluid-operated rappers or vibrators which comprise closed cylinders containing free-floating pistons that are pneumatically raised and lowered for impacting against the cope or drag parts of a sand casting flask for the purpose of compacting loose sand applied within the flask. Such rapper or vibration equipment utilizes a relatively small quantity of oil so that in a typical installation, less than a barrel of dirty oil may be generated in the course of a month.

Disposal of that barrel of dirty oil under conditions which avoid pollution or contamination is a problem for a typical small foundry. Thus, a simplified, inexpensive piece of equipment which can reclaim that oil and either eliminate or reduce the amount of foreign material for disposal can substantially eliminate the disposal problem. Of course, other types of manufacturing facilities, including metal cutting factories and the like, can equally utilize equipment for their disposal of small quantities of dirty, used oil.

SUMMARY OF INVENTION

This invention contemplates processing a small batch of "dirty" oil, as for example, on the order of between about 55 to 120 gallons at one time. The quantity may be increased or decreased somewhat, but in general, is small.

The batch of oil is placed within a vertically elongated, small tank having an immersion-type heater extending transversely of the tank at a distance above the bottom of the tank. The tank portion above the heater forms a circulating chamber, and the tank portion beneath the heater forms a settling bowl. One or more rows of permanent magnets may be arranged transversely of the tank above the heater.

The heater provides low-temperature heat to the oil contained within the tank in an elongated, transverse zone. This results in the oil circulating in closed loop paths flowing upwardly above the heater and downwardly towards the heater within the circulating chamber. The oil circulates in roughly laminar or planar vertical closed loops on the opposite sides of the plane containing the heater. The amount of heat applied, for example, may be very roughly on the order of around 150 degrees F. Thus, the oil is not substantially heated; rather, it is heated sufficiently to induce the circulatory flow. Meanwhile, the lower portion of the tank, that is, the settling bowl portion located beneath the heater, is maintained at ambient temperature which may vary from ordinary room temperature to near freezing temperature, depending upon the temperature in the plant or at the location of the tank.

The oil is circulated within the tank for a predetermined period of time, which may be a number of hours depending upon circumstances. During that time, dirt, sludge, debris, foreign particles, water and the like settle, by gravity, into the settling bowl portion of the tank. Water vapor and air may be permitted to escape through a suitable vent on the tank.

After a predetermined time, the circulating oil may be removed from the tank by a pump connected to an outlet in the upper, circulating portion of the tank. From time to time, the material collected in the lower portion of the tank in the settling bowl may be drained and discarded. Thus, the bulk of the oil can be re-used while the residue to be discarded is substantially reduced. The small amount of residue can be accumulated for a considerable period of time, which simplifies the disposal problem.

An important object of this invention is to provide a method and an apparatus which are extremely simple and inexpensive, so that the apparatus may be used within a plant or an intermittent use basis for economically reducing the problem of disposal of small quantities of used, dirty oil.

Another object of this invention is to provide an oil reclaiming or cleaning apparatus generally comprising a simplified tank within which a commercially available, inexpensive electrical immersion heater may be mounted along with commercially available magnets, so that the equipment essentially has no moving parts, and, therefore, may be used intermittently, without requiring any substantial maintenance.

Still another object of this invention is to provide a method and apparatus which may be operated with little labor for reclaiming small quantities of used oil at low cost. This conserves oil and permits re-use of oil within the industrial facility that initially used it.

These and other objects and advantages of this invention will become apparent upon reading the following description, of which the attached drawings form a part.

DETAILED DESCRIPTION

Figure 1:
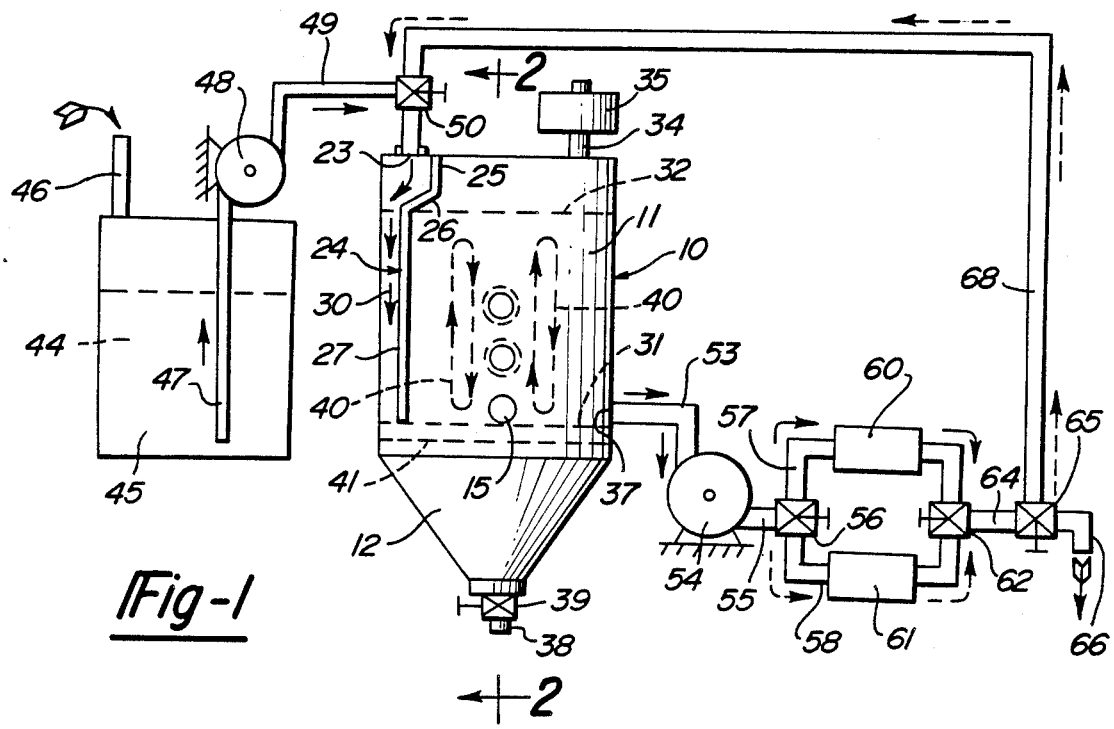
FIG. 1 is a schematic view of the apparatus for reclaiming small-size batches of dirty oil.

Referring to the drawings, the apparatus includes an upright or vertically axised tank 10. Preferably, the tank is formed with an upper cylinder portion 11 and a lower, inverted cone, bottom portion 12. A conventional electrical immersion heater 15 is transversely arranged near the bottom of the tank cylinder portion 11.

Figure 2:
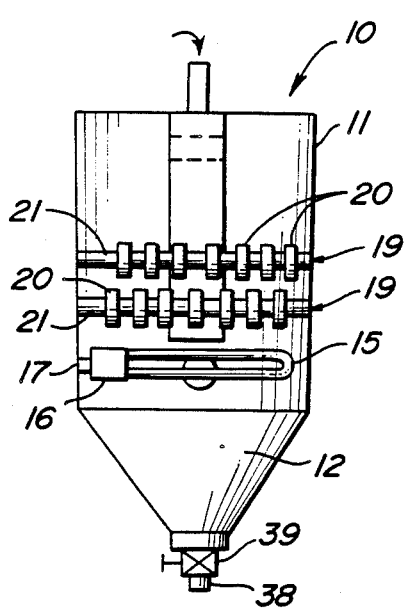
FIG. 2 is a schematic view taken in the direction of arrows 2—2 of FIG. 1 to schematically illustrate the positions of the heater, magnets and oil flow guide within the tank.

The heater includes a base 16 and a suitable mounting plug or support 17, which are shown schematically in FIG. 2. An example of a suitable immersion heater is one manufactured and sold by Double A, a subsidiary of Vickers, Inc. located in Manchester, Mich., and identified as a low-heat density, "Armto" trademark, series of immersion heaters with integral thermostats. These heaters are in the form of U-shaped bent rods which are internally electrically heated to provide specified amounts of heat. They are also referred to generically as "calrod" heaters. The heat output of such a heater may be selected depending upon the anticipated batch size, time desired for processing and other relevant factors used by those skilled in the heater art for selecting suitable model heaters for this intended purpose.

Located above the immersion heater are a pair of magnetic ferrous metal collectors 19. These collectors are formed of permanently magnetized, disk-shaped magnets mounted upon a support shaft 21. One or more of these collectors may be used, preferably two collectors mounted, one above the other, parallel to the heater. Although the magnetic collectors may vary, one suitable unit for this purpose is manufactured and provided by Hydro-Craft, Inc. and identified by Model No. HC-MT-22, having diskshaped magnets which are about 15/16 inch in diameter, ⅛ inch thick and mounted upon a ⅜ inch diameter pipe secured to a threaded plug for mounting in the threaded opening in the wall of the tank. Adjacent disks may be spaced apart, on their support pipe, a distance roughly equivalent to their thicknesses.

The magnetic collectors attract and immobilize particles of ferrous metal material contained within the processed fluid. From time to time, the magnetic collectors may be removed from the tank and cleaned of their accumulated particles. Since the collectors have no movable parts, they are available for intermittent use without maintenance, and they require only periodic cleaning.

A fluid inlet opening 23 is located at the top of the tank. In order to avoid splashing and pick-up of air, a guide or diverter plate 24 is located beneath the inlet opening for guiding the entry of fluid pouring into the tank. The guide includes an upper part 25 extending downwardly from an edge of the inlet opening 23. The upper part 25 is bent downwardly at an angle to form a fluid impact portion 26 which, in turn, is bent into a vertical, elongated lower plate part 27 along which the fluid trickles.

As illustrated schematically by the arrows 30, fluid enters the tank through the inlet opening 23 to impact against the guide impact portion 26 and flow down the elongated plate 27 of the guide. The fluid batch starts at a lower level 31, indicated in dotted lines in FIG. 1, and fills the tank to an upper level, which is shown in dotted lines at 32, or to some mid-level. As an example, a batch may be about 55 to 120 gallons.

A vent pipe 34 is provided at the top of the tank. A conventional air filter 35 is mounted upon the pipe 34. Thus, air and moisture may be vented out of the tank through the pipe 34. However, the filter traps particles carried by the vented material.

The tank is provided with a side outlet 37 which is generally aligned with the heater 15. In addition, the tank has a bottom drain outlet 38 located at the apex of the inverted cone base 16. A drain valve 39 closes the drain outlet and may be opened when desired.

Dirty oil placed in the tank is heated in the narrow heat zone around the elongated immersion heater 15 within the upper cylinder portion 11 above a temperature transition zone 41. The low-temperature heat zone causes circulation of the oil. The temperature may be roughly around 150 degrees F. This temperature may be somewhat lower, as for example, down to roughly 125 degrees F, and somewhat higher, such as roughly up to 185 degrees F or 200 degrees F. Significantly, the temperature is relatively low.

Figure 3:
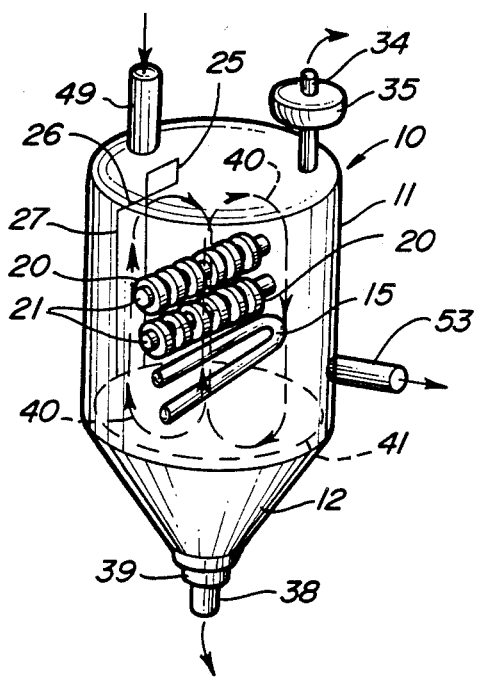
FIG. 3 is a schematic, perspective view illustrating the circulation of the oil within the tank.

The upper portion of the tank forms a circulation chamber in which the oil moves in closed-loop paths schematically indicated by the arrows 40 in FIGS. 1 and 3. The flow paths are roughly laminar, i.e. in roughly vertical planes. Thus, the upward and downward circulation of the warm oil within the tank causes foreign materials, including water, dirt, debris, particles and the like to move, by gravity, towards the bottom of the tank.

The upper circulation chamber portion of the tank is generally separated from the lower accumulation or settling bowl portion of the tank by a temperature transition zone 41 which is illustrated in dotted lines in FIG. 1. The lower portion of the tank below the transition zone is generally maintained at ambient temperature which may be relatively cold, depending upon local climate and equipment location. Thus, the lower portion of the tank may be at ordinary room temperature down to close to freezing.

The foreign materials accumulated in the bottom or settling bowl portion of the tank remain there for a number of batch cycles. Periodically, the accumulated foreign material in the lower portion of the tank remains and is drained by opening the drain valve. The drained material may be recycled or filtered for removing much of the debris or foreign material, and the oil from the drain bowl portion may be returned to the next batch for recycling.

The tank may be used in a system in which dirty oil 44 is accumulated in a reservoir or sump 45 (see FIG. 1). The oil may flow into the reservoir through an inlet pipe 46. When sufficient fluid has accumulated for processing, the fluid is removed from the reservoir through a removal pipe 47 attached to a pump 48. The pump forces the fluid through a pipe 49 and a junction valve 50 into the inlet opening 23 of the tank 10.

After the fluid has been processed in the tank, such as by letting the circulation take place over a suitable number of hours, depending upon the condition of the fluid, size of the batch, size of the tank, and trial and error optimum efficiency determinations, the clean fluid is removed from the tank through a clean fluid outlet pipe 53 attached to the tank side outlet 37.

A pump 54 pumps the clean fluid through a pipe 55 to a splitter valve 56 which diverts the fluid to either one of a pair of parallel filter circuits 57 and 58. These circuits contain removable and replaceable, conventional filters 60 and 61 for filtering out fine particles remaining in the fluid. The filter circuits converge through a valve 62 for flowing the filtered fluid through a pipe 64 and a valve 65 to the system outlet 66. The clean fluid may be taken from the system outlet 66 for re-use in the plant either in suitable separate containers or through pipes.

In some instances, it is desired to reprocess the fluid for greater cleanliness. Thus, for a second pass-through, the fluid may be diverted by the valve 65 through a return pipe 68 to the junction valve 50 and back to the tank inlet opening 23. In that case, the fluid may be recirculated as mentioned above.

Depending upon the size, oil cleanliness requirements, and oil quantities, additional tanks may be added to the system. For example, two or three tanks may be arranged side by side for sequentially processing the oil.

This invention may be further developed within the scope of the following claims. Accordingly, having fully described an operative embodiment of this invention, I now claim:

1. A method for reclaiming oil by removing therefrom foreign materials including water, sludge, dirt, metal particles and other foreign materials, comprising:

providing a vertically axised tank whose upper portion forms a circulation chamber and whose lower portion forms a settling bowl;

placing a batch of oil to be reclaimed into the tank;

applying low-temperature heat to the oil in a heat zone extending transversely of the tank and located near the bottom of the tank upper portion;

maintaining the tank lower portion at a lower temperature than the heat zone;

circulating the heated oil in a generally vertical, closed loop path, upwardly from the heat zone towards the top of the tank upper portion and downwardly towards the heat zone by the application of said heat to the oil;

subjecting the circulating fluid within the tank upper portion to a magnetic field arranged within the tank above the heat zone and formed by magnets for attracting and immobilizing ferrous metal particles carried by the oil, so as to remove such particles from the oil;

permitting foreign particles mixed into the oil to settle, by gravity, downwardly into the tank lower portion while the oil is circulated within the tank upper portion;

pumping the oil from the tank upper portion after a predetermined period of circulation therein; and draining the tank lower portion from its bottom from time to time, but at a time when the tank upper portion has been pumped out for removing oil and foreign material accumulated in the tank lower portion.

2. A method as defined in claim 1, and including venting moisture and air out of the top of the tank upper portion to atmosphere while the fluid is circulated within the tank.

3. A method as defined in claim 2, and including generally maintaining the temperature of the applied heat in the range of from about 125 to about 185 degrees F.

4. A method as defined in claim 2, and including maintaining the temperature of the applied heat at about 150 degrees F.

5. An apparatus for reclaiming relatively small quantities of oil-type hydraulic and lubricating fluid by removing therefrom foreign materials, including water, dirt, sludge, metal particles and other foreign materials, comprising:

a vertically axised tank having an upper portion forming a fluid circulating chamber and a lower portion forming a settling bowl;

an elongated, low-temperature heater located within said chamber, near the bottom of the chamber and above the settling bowl, and extending transversely of the chamber;

a fluid inlet formed in the chamber and a normally closed fluid outlet formed near the bottom of the chamber;

a vent opening to atmosphere formed in the top of the chamber;

a normally closed drain formed in the bottom of the settling bowl;

a transversely extending row of permanent magnets arranged within the chamber above the heater and exposed to the fluid for thereby magnetically attracting and immobilizing upon the magnets magnetically attractable ferrous metal particles carried by the fluid;

whereby when the tank is substantially filled with a fluid, a transverse heat zone is produced by the heater at the bottom of the chamber and above the settling bowl, which heat zone causes the fluid to circulate upwardly and downwardly in a closed-loop path within the chamber above the settling bowl, and foreign materials gravity-settle during the circulation of the fluid into the settling bowl so that the cleaned fluid in the chamber may be flowed out of the tank fluid outlet for re-use, and the settling bowl may be periodically drained of its accumulated fluid and foreign material contents from time to time during a period that the tank chamber is substantially emptied of fluid.

6. An apparatus as defined in claim 5, and including at least one transversely extending row of permanent magnets arranged within the chamber above the heater and exposed to the circulating fluid for thereby magnetically attracting and immobilizing upon the magnets magnetically attractable ferrous particles carried by the fluid.

7. An apparatus as defined in claim 6, and including said elongated heater and row of magnets being substantially horizontally arranged and substantially parallel to each other.

8. An apparatus as defined in claim 7, and including said fluid inlet being located at the top of the chamber, with a fluid flow guide arranged beneath the fluid inlet for guiding the fluid flow to the bottom of the chamber;

said guide comprising a vertically elongated, narrow, substantially flat plate having an upper end extending downwardly from an edge of the inlet, with the plate having a downwardly angled, bent portion located beneath the inlet for directly receiving thereon the fluid flow and then terminating in a downwardly extending, elongated portion which extends substantially to the bottom of the chamber.

9. An apparatus as defined in claim 5, and including a second transversely extending row of permanent magnets arranged a desired distance above the first-mentioned row of magnets and exposed to the circulating fluid.

10. An apparatus as defined in claim 9, and said elongated heater and rows of magnets being substantially horizontally arranged and substantially parallel to each other.

11. An apparatus as defined in claim 9, and said fluid inlet comprising an opening at the top of the chamber;
a fluid flow guide arranged beneath the opening for smoothly guiding incoming fluid flow to the bottom of the chamber;
said guide comprising a vertically elongated, narrow, substantially flat plate having an upper end extending downwardly from the fluid opening, with the plate having a downwardly angled, bent portion located beneath the opening for directly receiving the fluid flow thereon, and the plate terminating below said bent portion in a long, downwardly extending, generally straight portion extending substantially to the bottom of the chamber.

12. An apparatus as defined in claim 5, and including said tank upper portion being formed of a vertically axised cylinder and the tank settling bowl being formed substantially in the shape of an inverted cone with the drain formed at the apex of the cone.

13. An apparatus as defined in claim 5, and including the tank circulation chamber having a small capacity, such as in the range of roughly between about 55-120 gallons, for thereby processing a relatively small batch of fluid at one time.

14. An apparatus for reclaiming relatively small quantities of oil-type hydraulic and lubricating fluid by removing therefrom foreign materials, including water, dirt, sludge, metal particles and other foreign materials, comprising:
a vertically axised tank having an upper portion forming a fluid circulating chamber and a lower portion forming a settling bowl;
an elongated, low-temperature heater located within said chamber, near the bottom of the chamber and above the settling bowl, and extending transversely of the chamber;
a fluid inlet formed in the chamber and a normally closed fluid outlet formed near the bottom of the chamber;
a vent opening to atmosphere formed in the top of the chamber;
a normally closed drain formed in the bottom of the settling bowl;
a transversely extending row of permanent magnets arranged within the chamber above the heater and exposed to the fluid for thereby magnetically attracting and immobilizing upon the magnets magnetically attractable ferrous metal particles carried by the fluid;
a second transversely extending row of permanent magnets arranged a distance above the first-mentioned row of magnets and exposed to the circulating fluid and said elongated heater and rows of magnets being substantially horizontally arranged and substantially parallel to each other;
whereby when the tank is substantially filled with a fluid, a transverse heat zone is produced by the heater at the bottom of the chamber and above the settling bowl, which heat zone causes the fluid to circulate upwardly and downwardly in a closed-loop path within the chamber above the settling bowl, and foreign materials gravity-settle during the circulation of the fluid into the settling bowl so that the cleaned fluid in the chamber may be flowed out of the tank fluid outlet for re-use, and the settling bowl may be periodically drained of its accumulated fluid and foreign material contents from time to time during a period that the tank chamber is substantially emptied of fluid.

15. An apparatus for reclaiming relatively small quantities of oil-type hydraulic and lubricating fluid by removing therefrom foreign materials, including water, dirt, sludge, metal particles and other foreign materials, comprising:
a vertically axised tank having an upper portion forming a fluid circulating chamber and a lower portion forming a settling bowl;
an elongated, low-temperature heater located within said chamber, near the bottom of the chamber and above the settling bowl, and extending transversely of the chamber;
a fluid inlet formed in the chamber and a normally closed fluid outlet formed near the bottom of the chamber said fluid inlet comprising an opening at the top of the chamber;
a fluid flow guide arranged beneath the opening for smoothly guiding incoming fluid flow to the bottom of the chamber;
said guide comprising a vertically elongated, narrow, substantially flat plate having an upper end extending downwardly from the fluid opening, with the plate having a downwardly angled, bent portion located beneath the opening for directly receiving the fluid flow thereon, and the plate terminating below said bent portion in a long, downwardly extending, generally straight portion extending substantially to the bottom of the chamber;
a vent opening to atmosphere formed in the top of the chamber;
a normally closed drain formed in the bottom of the settling bowl;
whereby when the tank is substantially filled with a fluid, a transverse heat zone is produced by the heater at the bottom of the chamber and above the settling bowl, which heat zone causes the fluid to circulate upwardly and downwardly in a closed-loop path within the chamber above the settling bowl, and foreign materials gravity-settle during the circulation of the fluid into the settling bowl so that the cleaned fluid in the chamber may be flowed out of the tank fluid outlet for re-use, and the settling bowl may be periodically drained of its accumulated fluid and foreign material contents from time to time during a period that the tank chamber is substantially emptied of fluid.

16. An apparatus for reclaiming relatively small quantities of oil-type hydraulic and lubricating fluid by removing therefrom foreign materials, including water, dirt, sludge, metal particles and other foreign materials, comprising:
a vertically axised tank having an upper portion forming a fluid circulating chamber and a lower portion forming a settling bowl;
an elongated, low-temperature heater located within said chamber, near the bottom of the chamber and above the settling bowl, and extending transversely of the chamber;

a fluid inlet formed in the chamber and a normally closed fluid outlet formed near the bottom of the chamber;

a vent opening to atmosphere formed in the top of the chamber;

a normally closed drain formed in the bottom of the settling bowl;

at least one transversely extending row of permanent magnets arranged within the chamber above the heater and exposed to the fluid for thereby magnetically attracting and immobilizing upon the magnets magnetically attractable ferrous particles carried by the fluid, and including said elongated heater and row of magnets being substantially horizontally arranged and substantially parallel to each other;

whereby when the tank is substantially filled with a fluid, a transverse heat zone is produced by the heater at the bottom of the chamber and above the settling bowl, which heat zone causes the fluid to circulate upwardly and downwardly in a closed-loop path within the chamber above the settling bowl, and foreign materials gravity-settle during the circulation of the fluid into the settling bowl so that the cleaned fluid in the chamber may be flowed out of the tank fluid outlet for re-use, and the settling bowl may be periodically drained of its accumulated fluid and foreign material contents from time to time during a period that the tank chamber is substantially emptied of fluid.

* * * * *

UNITED STATES PATENT AND TRADEMARK OFFICE
CERTIFICATE OF CORRECTION

PATENT NO. : 4,876,015

DATED : Oct. 24, 1989

INVENTOR(S) : KENNETH D. MC KIBBEN

It is certified that error appears in the above-identified patent and that said Letters Patent is hereby corrected as shown below:

In col. 1, line 9, change "smallquantity" to --small-quantity--
In col. 1, line 40, change "inplant" to --in-plant--
In col. 3, line 46, change "diskshaped" to --disk-shaped--
In col. 3, line 47, change "15/16" to --1 5/16--

Signed and Sealed this

Twenty-sixth Day of February, 1991

Attest:

HARRY F. MANBECK, JR.

*Attesting Officer*   *Commissioner of Patents and Trademarks*